Figure 1:
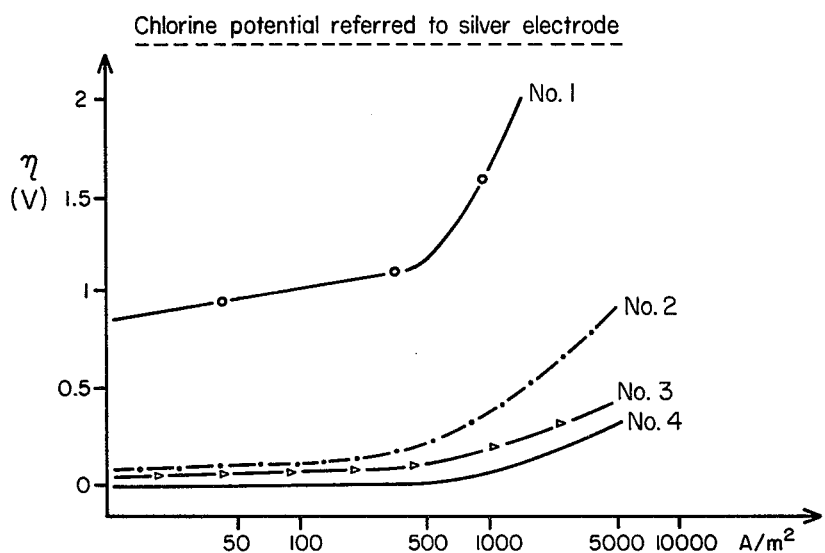

United States Patent [19]

De Nora et al.

[11] 4,111,765

[45] Sep. 5, 1978

[54] SILICON CARBIDE-VALVE METAL BORIDES-CARBON ELECTRODES

[75] Inventors: Vittorio De Nora, Nassau, The Bahamas; Antonio Nidola; Placido Maria Spaziante, both of Lugano, Switzerland

[73] Assignee: Diamond Shamrock Technologies S.A., Geneva, Switzerland

[21] Appl. No.: 820,834

[22] Filed: Aug. 1, 1977

Related U.S. Application Data

[63] Continuation-in-part of Ser. No. 754,025, Dec. 23, 1976, abandoned.

[51] Int. Cl.$^2$ .................. C25B 1/34; C25B 11/00; C25B 3/06; C25B 7/02
[52] U.S. Cl. ........................................ 204/67; 204/98; 204/243 R; 204/252; 204/254; 204/290 R; 204/290 F; 204/291
[58] Field of Search ........... 204/290 R, 290 F, 290 G, 204/291, 67, 98, 243, 252, 254

[56] References Cited

U.S. PATENT DOCUMENTS

| | | | |
|---|---|---|---|
| 3,330,756 | 7/1967 | Ransley | 204/279 |
| 3,632,498 | 1/1972 | Beer | 204/290 F |
| 3,645,862 | 2/1972 | Cotton et al. | 204/56 R |
| 3,661,736 | 5/1972 | Holliday | 204/67 |
| 3,687,724 | 8/1972 | Keith et al. | 204/290 F X |
| 3,788,968 | 1/1974 | Müller et al. | 204/290 R |

*Primary Examiner*—F.C. Edmundson
*Attorney, Agent, or Firm*—Hammond & Littell

[57] ABSTRACT

Novel sintered electrodes consisting essentially of 40 to 90% by weight of at least one valve metal boride, 5 to 40% by weight of silicon carbide and 5 to 40% by weight of carbon useful for electrolysis reactions, particularly electrolysis of halide ions to the corresponding halogen and to a novel electrolytic cell, a novel bipolar electrode and to a novel process for effecting the electrochemical processes, particularly electrolysis of molten metal halides.

5 Claims, 2 Drawing Figures

SILICON CARBIDE-VALVE METAL BORIDES-CARBON ELECTRODES

PRIOR APPLICATION

This application is a continuation-in-part of our co-pending, commonly assigned U.S. patent application Ser No. 754,025 filed Dec. 23, 1976, now abandoned.

STATE OF THE ART

Dimensionally stable electrodes for anodic and cathodic reactions in electrolysis cells have recently become of general use in the eletrochemical industry replacing the consumable electrodes of carbon, graphite and lead alloys. They are particularly useful in flowing mercury cathode cells and in diaphragm cells for the production of chlorine and caustic, in metal electrowinning cells wherein pure metal is recovered from chloride or sulfate aqueous solution as well as in the cathodic protection of ships' hulls and other metal structures.

Dimensionally stable electrodes generally comprise a valve metal base, such as Ti, Ta, Zr, Hf, Nb and W, which under anodic polarization develope a corrosion-resistant but non-electrically conductive oxide layer or "barrier layer," coated over at least a portion of the surface with an electrically conductive and electrocatalytic layer containing platinum group metal oxides or platinum group metals (see U.S. Pat. Nos. 3,711,385; 3,763,498 and 3,846,273) and sometimes oxides of also valve metals. Molybdenum, vanadium, aluminum and yttrium are also metals which, within certain environments, show distinct valve metal characteristics, i.e. the formation of a filming layer of oxides substantially protecting the metal from further oxidation or corrosion. (e.g. anodic treatment of Al).

Electroconductive and electrocatalytic coatings made of or containing platinum group metals or platinum group metal oxides are, however, expensive and are eventually subjected to consumption or deactivation in certain electrolytic processes and, therefore, reactivation or recoating is necessary to reactivate exhausted electrodes.

Furthermore, electrodes of this type are not operable in a number of electrolytic processes. For example, in molten salt electrolytes, the valve metal support is rapidly dissolved, since the thin protective oxide layer is either not formed at all or is rapidly destroyed by the electrolyte with the consequent dissolution of the valve metal base and loss of the catalytic noble metal coating. Moreover, in several aqueous electrolytes,such as bromide solutions or in sea-water, the breakdown voltage of the protective oxide layer on the exposed valve metal base is too low and the valve metal base is often corroded under anodic polarization.

Recently, other types of electrodes have been suggested to replace the rapidly consumed anodes and carbon cathodes in severely corrosive applications, such as the electrolysis of molten salts, typically for the electrolysis of molten fluoride baths such as those used to produce aluminum from molten cryolite. In this particular electrolytic process, which is of great economic importance, carbon anodes are consumed at a rate of approximately 500 kg of carbon per ton of aluminum produced and expensive constant adjustment apparatus is used to maintain a small and uniform gap between the corroding anode surface and the liquid aluminum cathode. It is estimated that over 6 million tons of carbon anodes are consumed in one year by aluminum producers. The carbon anodes are burned away according to the reation:

$$Al_2O_3 + 3/2\ C \rightarrow 2Al + 3/2\ CO_2$$

but the actual consumption rate is much higher due to fragilization and breaking away of carbon particles and to intermittent sparking which takes place across anodic gas films which often form over areas of the anode surface since carbon is poorly wetted by the molten salt electrolytes, or to short circuiting caused by "bridges" of conductive particles coming from the corroding carbon anodes and from dispersed particles of the depositing metal.

British Pat. No. 1,295,117 discloses anodes for molten cryolite baths consisting of a sintered ceramic oxide material consisting substantially of $SnO_2$ with minor amounts of other metal oxides, namely, oxides of Fe, Sb, Cr, Nb, Zn, W, Zr, Ta in concentrations of up to 20%.

While electrically conducting sintered $Sno_2$ with minor additions of other metal oxides, such as oxides of Sb, Bi, Cu, U, Zn, Ta, As, etc., has been used for a long time as a durable electrode material in alternating current glass smelting furnaces (see U.S. Pat. Nos. 2,490,825; 2,490,826; 3,282,284 and 3,502,597), it shows considerable wear and corrosion when used as anode material in the electrolysis of molten salts.

We have found wear rates of up to 0.5 grams per hour per cm² from samples of the compositions described in the patents mentioned above when operated in fused cryolite electrolytes at 3000 A/m². The high wear rate of sintered $SnO_2$ electrodes is thought to be due to several factors: a) chemical attack by the hologens, in fact $Sn^{IV}$ gives complexes of high corrodination numbers with halogen ions; b) reduction of $SnO_2$ by aluminum dispersed in the electrolyte; and c) mechanical erosion by anodic gas evolution and salt precipitation within the pores of the material.

Japanese Patent Application No. 112589 (Publication No. 62,114,of 1975) discloses electrodes having a conductive support of titanium, nickel or copper or an alloy thereof, carbon, graphite or other conductive material coated with a layer consisting substantially of spinel and/or perovskite type metal oxides and alternatively electrodes obtained by sintering mixtures of said oxides. Spinel oxides and perovskite oxides belong to a family of metal oxides which typically show good electronic conductivity and have been proposed previously as suitable electroconductive and electrocatalytic anodic coating materials for dimensionally stable valve metal anodes (see U.S. Pat. Nos. 3,711,382 and 3,711,297; Belgian Pat. No. 780,303).

Coatings of particulate spinels and/or perovskites have been found, however, to be mechanically weak as the bonding between the particulate ceramic coating and the metal or carbon substrate is inherently weak, because the crystal structure of the spinels and of the perovskites are not isomorphous with the oxides of the metal support and various binding agents such as oxides, carbides, nitrides and borides have been tried with little or no improvement. In molten salt electrolytes, the substrate material is rapidly attacked due to the inevitable pores through the spinel oxide coating and the coating is quickly spalled off the corroding substrate. Furthermore, spinels and perovskites are not chemically or electrochemically stable in molten halide salt electrolytes and show an appreciable wear rate due to halide ion attack and to the reducing action of dispersed metal.

In the electrolytic production of metals from molten halide salts, the mentioned anodes of the prior art have been found to have another disadvantage. The appreciable dissolution of the ceramic oxide material brings metal cations into the solution which deposit on the cathode together with the metal which is being produced and the impurity content in the recovered metal is so high that the metal can no longer be used for applicatins requiring electrolytic grade purity. In such cases, the economic advantages of the electrolytic process which are due, to a large extent, to the high purity attainable, compared to the smelting processes are partially or entirely lost.

An electrode material to be used successfully in severely corrosive conditions such as in the electrolysis of molten halide salts and particularly of molten fluoride salts, should primarily be chemically and electrochemically stable at the operating conditions. It should also be catalytic with respect to the anodic evolution of oxygen and/or halides, so that the anode overpotential is lowest for high overall efficiency of the electrolysis process. The electrode should also have thermal stability at operating temperatures of i.e., about 200° to 1100° C, good electrical conductivity and be sufficienctly resistant to accidental contact with the molten metal cathode. Excluding coated metal electrodes, since hardly any metal substrate could resist the extremely corrosive conditions found in molten fluoride salts electrolysis, we have systematically tested the performances of a very large number of sintered substantially ceramic electrodes of different compositions.

U.S. Pat. No. 3,636,856 describes electrodes made of titanium carbide impregnated graphite for electrolysis of manganese sulfate solutions to produce manganese dioxide and U.S. Pat. Nos. 3,028,324; 3,215,615; 3,314,876 and 3,330,756 relate to aluminum electrolysis cells using valve metal borides and valve metal carbides as current collectors. U.S. Pat. No. 3,459,515 relates to an aluminum electrolytic cell with a current collector consisting titanium carbide-titanium boride and/or zirconium boride and up to 30% of aluminum. U.S. Pat. No. 3,977,959 describes an electrode of tantalum, tantalum boride, tantalum carbide and a metal of the iron group.

OBJECTS OF THE INVENTION

It is an object of the invention to provide novel improved electrodes consisting essentially of silicon carbide-valve metal boride-carbon and to novel bipolar electrodes.

It is another object of the invention to provide a novel electrolysis cell equipped with silicon carbide-valve metal boride-carbon anodes.

It is an additional object of the invention to provide a novel electrochemical process using the electrodes of the invention.

These and other objects and advantages of the invention will become obvious from the following detailed description.

THE INVENTION

The novel sintered electrodes of the invention consist essentially of 40 to 90% by weight of at least one valve metal boride, 5 to 40% by weight of silicon carbide and 5 to 40% by weight of carbon.

The said electrodes are useful in electrochemical processes such as the electrolysis of aqueous halide solutions, for electrowinning of metals from aqueous sulfate or halide solutions and for other processes in which an electric current is passed through an electrolyte for the purpose of decomposing the electrolyte, for carrying out oxidations and reduction of organic and inorganic compounds or to impress a cathodic potential to a metallic structure which has to be protected for corrosion, as well as for primary and secondary batteries. The electrodes of the invention may be polarized as anodes or as cathodes or may be utilized as bipolar electrodes, whereby one face or end of the electrode acts as anode and the opposite face or end of the electrode acts as cathode with respect to the electrolyte contacting each face of the electrode respectively, as is known in the art of electrolysis.

The word "sintered" is used to described the mixture of the specified silicon carbide-valve metal boride-graphite in a self-sustaining essentially rigid body by any of the known methods used in the ceramic industry such as by application of pressure and temperature to a powder mixture, by casting of the material in molds, by extrusion or by bonding agents, etc. The words "bonded electrodes," "cast electrodes" or "sintered electrodes", even when used separately are essentially synonymouns and the component materials may be in the crystalline and/or amorphous state. Valve metal is intended to include titanium, tantalum, hafnium, zirconium, aluminum, niobium and tungsten and alloys thereof particularly suited for anodic polarization and molybdenum, vanadium and yttrium particularly suited for cathodic polarization.

Electrodes made of valve metal borides such as zirconium boride or titanium boride tend to dissolve when used as an anode in a molten salt bath like aluminum chloride and have a rather high overpotential for chlorine. Valve metal carbides when used in such molten salt baths tend to disintegrate and carbon or graphite alone has a poor life.

In contrast thereto, the electrodes of the invention have good electronic and electrical conductivity, a chlorine overpotential lower than that of graphite and mixtures of valve metal boride-silicon carbide electrodes, good corrosion resistance and good wettability by the molten salt electrolyte in which it comes in contact. Moreover, the electrodes can be operated as anodes at high current density such as 5,000 to 10,000 amperes or more per square meter.

When the electrodes are obtained by sintering, the particles of the component powders may have a grain size which can vary between 50 to 500 microns and normally the powder mixture contains a certain range of grain sizes to obtain a better degree of compaction. The electrodes may be prepared by the conventional methods used in the ceramic industry. In one of the preferred methods, the mixture of powders is mixted with water or with an organic binding agent to obtain a plastic mass having suitable flowing properties for the particular forming process used. The material may be molded in known manner either by ramming or pressing the mixture in a mold or by slip-casting in a plaster of Paris mold or the material may be extruded through a die in various shapes.

The molded electrodes are then subjected to a drying process and heated at a temperature at which the desired bonding can take place, for a period of between 1 to 30 hours, normally followed by slow cooling to room temperature. The heat treatment is preferably carried out in an inert atmosphere or one that is slightly reducing, for example in $H_2 + N_2$ (80%).

The forming process may be followed by the sintering process at a high temperature as mentioned above or the forming process and the sintering process may be simultaneous, that is, pressure and temperature may be applied simultaneously to the powder mixture, for example by means of electrically heated molds. Lead-in connectors may be fused into the electrodes during the molding and sintering process or attached to the electrodes after sintering or molding.

A metal netting or core or flexible core material may be provided inside the body of the sintered electrodes to improve the current distribution and to provide for easier electrical connection of the electrode to the electric supply system and to reinforce the sintered body.

The process of the invention may be used effectively for the electrolysis of many electrolytes. The electrodes may be used as anodes and/or cathodes in electrochemical process such as the electrolysis of aqueous chloride solutions for production of chlorine, caustic, hydrogen, hypochlorite, chlorate and perchlorate; the electrowinning of metals from aqueous sulfate or chloride solutions for production of copper, zinc, nickel, cobalt and other metals; and for the electrolysis of bromides, sulfides, sulfuric acid, hydrochloric acid and hydrofluoric acid.

Generally, the process of the invention is useful where an electric current is passed through an electrolyte to decompose the electrolyte, for effecting oxidation and reduction of organic and inorganic compounds or to impress a cathodic potential on a metallic structure to protect it from corrosion as well as in primary and secondary batteries.

When the process of the invention uses bipolar electrodes, the composition of the cathode portion of the electrodes must be such that it will be resistant to the particular cathodic conditions.

Therefore, the cathode portion of the bipolar electrode may contain other materials which improve the characteristics of the electrodes of the invention such as the carbides, borides, silicides, nitrides, sulfides and/or carbonitrides of metals, particularly the valve metals, molybdenum, vanadium and yttrium. Yttrium, titanium or zirconium borides are preferred materials for the cathodic side of bipolar electrodes.

By appropriate powder mixing techniques the composition of the bipolar electrodes of the invention may be varied across the cross-section of the electrode. That is the superfical layers of the cathodic surface of the bipolar electrode may be enriched with yttrium, titanium or zirconium boride during the molding process and before sintering is completed.

The electrolysis cell of the invention comprises a cell provided with at least one set of a spaced anode and cathode and a means for impressing an electrolysis current on the said cell, the said anode being a dimensionally stable, three component electrode as discussed above. The cell is preferably used for electrolysis of molten metal salts such as aluminum chloride.

Figure 2:
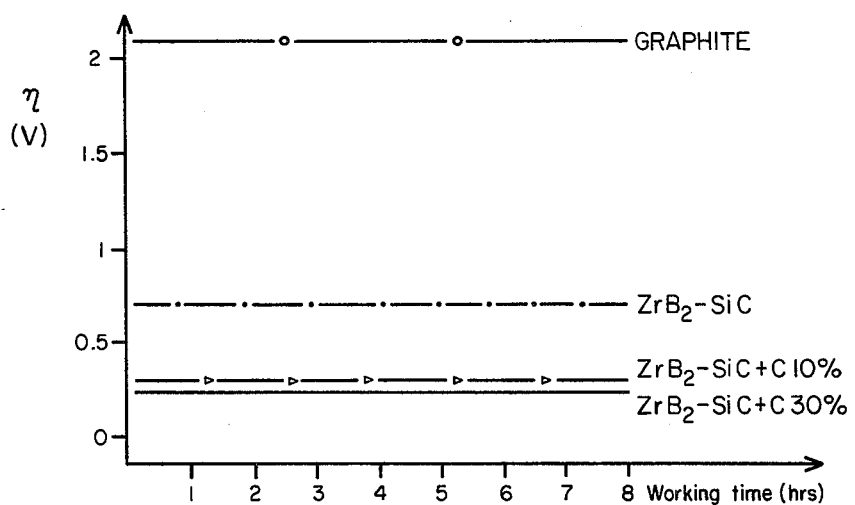

FIG. 1 is a graph of the chlorine potention of the electrodes of Example 1 with reference to a silver electrode, and FIG. 2 is a graph of the chlorine potention with the electrodes of Example 2.

The following examples describe several preferred embodiments to illustrate the invention. However, it should be understood that the invention is not intended to be limited to the specific embodiments.

EXAMPLE 1

About 250 g of the materials indicated in Table I were ground in a mixer for 20 minutes and the powder mixtures were poured into cylindrical plastic molds and pre-compressed manually with a steel cylinder press. Each mold was placed in an isostatic pressure chamber and the pressure was raised to about 1500 $Kg/cm^2$ in 5 minutes and then reduced to zero in a few seconds. The samples were then taken out of the plastic molds and polished. The pressed samples were put into an electrically heated furnace and heated from room temperature to 1500° C under a nitrogen atmosphere over a period of 24 hours, held at the maximum temperature for 2 to 5 hours and then cooled to 20° C over the following 24 hours. The sintered samples were then taken out of the furnace and after cooling to room temperature, they were weighed.

The conditions of operation of an electrolytic cell for the production of aluminum metal from a molten cryolite bath were simulated in a laboratory test cell. In a heated crucible of graphite, a layer of liquid aluminum was provided on the bottom and a melt consisting of 56% by weight of $AlCl_3$, 19.5% by weight of NaCl and 24.5% by weight of KCl was poured on top thereof. The sample electrodes prepared according to the procedure described above and to which a Pt wire was brazed to provide an easy means for electrical connection were dipped into the salt melt and held at a distance of about 1 cm from the liquid aluminum layer. The crucible was maintained at a temperature ranging from 700° C and the current density was 5KA/$m^2$ and the cell was operated for 8 hours. The experimental data obtained is shown in the following graph.

TABLE I

| Electrode No. | Composition | | Dimensions |
|---|---|---|---|
| 1 | | Graphite | 20 × 20 × 30 mm |
| 2 | $ZrB_2$(80%) | + SiC(20%) | 20 × 20 × 30 mm |
| 3 | $ZrB_2$(72%) | + SiC(18%) | |
| | | + C(10%) | φ60 × 10 mm |
| 4 | $ZrB_2$(56%) | +SiC(14%) | |
| | | + C(30%) | φ60 × 10 mm |

The above results show that the chlorine potential for graphite is 1.5 to 1.7 volts higher than the electrodes of the invention. Moreover, the chlorine potential for electrodes 3 and 4 of the invention is less than that of electrode No. 2 which does not contain any free carbon. No corrosion was noted during the 8 hours operation. Moreover, as can be seen from the curves of electrodes 3 and 4, the chlorine potential is slightly lower as the carbon content increases.

EXAMPLE 2

The chlorine potential for the electrodes No. 1 to 4 of Example 1 was determined with reference to a silver electrode at 2.5 KA/$m^2$ and the results reported in the following graph shows no change in the chlorine potentional after 8 hours.

Various modifications of the electrodes, cells and electrochemical processes of the invention may be made without departing from the spirit or scope thereof and it is to be understood that the invention is to be limited only as defined in the appended claims.

We claim:

1. A sintered anode consisting essentially of 40 to 90% by weight of at least one boride of a metal selected from the group consisting of titanium, tantalum, zirconium, aluminum, hafnium, niobium, tungsten, yttrium, molybdenum and vanadium, 5 to 40% by weight of silicon carbide and 5 to 40% by weight of carbon.

2. The anode of claim 1 wherein the valve metal boride is zirconium boride.

3. In a process for direct current electrolysis of a liquid electrolyte between an anode and a cathode, the improvement wherein the anode is an electrode of claim 1.

4. A bipolar electrode comprising a self-sustaining body with the anode portion consisting essentially of 40 to 90% by weight of at least one boride of a metals selected from the group consisting of titanium tantalum, zirconium, aluminum, hafnium, niobium, tungsten, yttrium, molybdenum and vanadium, 5 to 40% by weight of silicon carbide and 5 to 40% by weight of carbon and the cathodic section is at least one member selected from the group consisting of borides, carbides, nitrides, silicides, nitrides, sulfides and carbonitrides of a metal selected from the group consisting of Ti, Ta, Al, Nb, W, Mo, V, Y, Zr and Hf and mixtures thereof.

5. In an electrolysis cell for electrochemical reactions comprised of at least one pair of an anode and a cathode and means for impressing an electrolysis current on the cell, the improvement wherein the anode is an electrode of claim 1.

* * * * *